Patented Jan. 12, 1932

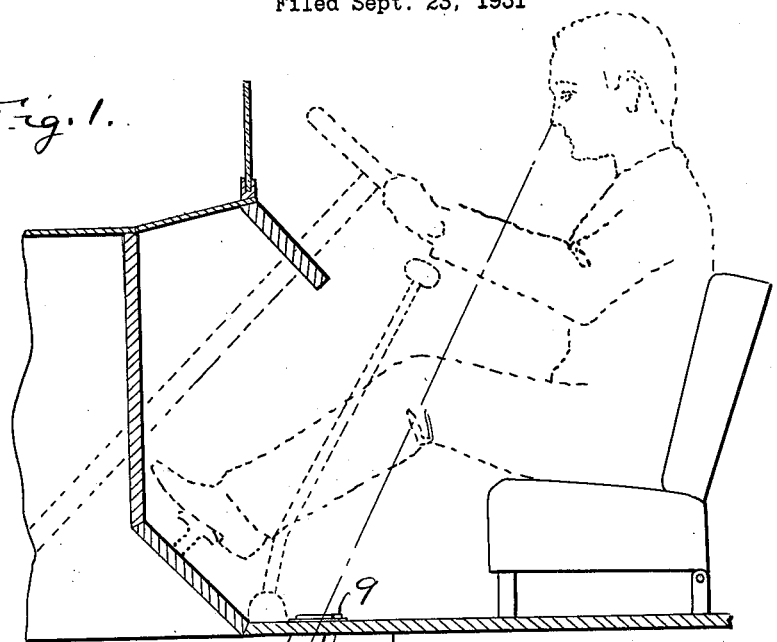
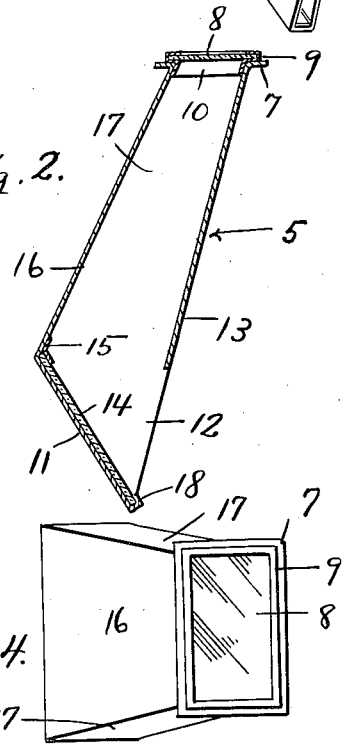
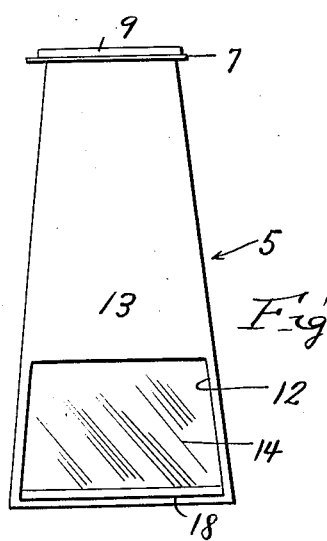

1,841,176

UNITED STATES PATENT OFFICE

WILLIAM Z. FROMER, OF BAYONNE, NEW JERSEY, ASSIGNOR, BY DIRECT AND MESNE ASSIGNMENTS, TO REAR VISION, INC., A CORPORATION OF NEW JERSEY

REAR VISION DEVICE FOR AUTOMOBILES

Application filed September 23, 1931. Serial No. 564,632.

This invention has reference broadly to rear vision devices for automobiles and similar vehicles, and has as its primary object the provision of means whereby the occupant and more particularly the operator of the automobile may obtain an unobstructed vision to the rear of the automobile to facilitate avoiding possible accidents which are often caused by one being unable to clearly ascertain what vehicle, pedestrian, or other obstacle is in the line of travel.

Heretofore rear vision devices consisted usually in the provision of a mirror suitably located either interiorly or exteriorly of the automobile, and the main objection to such is that a second person or occupant of the vehicle may get in the line of vision obstructing and impairing the vision of the operator.

According to the present invention a horizontally disposed transparent panel is located in position within the automobile convenient to the operator, and in line with this transparent panel and disposed beneath the automobile is an inclined mirror so that one looking through the transparent panel will, by reason of the mirror obtain a clear view to the rear of the automobile.

Other objects and advantages of the invention, together with the nature of the invention will be best understood from a study of the following description, taken in connection with the accompanying drawings wherein:

Figure 1 is a fragmentary vertical sectional elevational view taken through the front portion of an automobile, showing the application of my invention thereto.

Figure 2 is a longitudinal sectional view taken through the rear vision device.

Figure 3 is a rear elevational view thereof.

Figure 4 is a top plan view thereof.

As shown in the accompanying drawings, and in the preferred embodiment of the invention, there is provided a casing 5 tapering toward one end and at the smallest end thereof being open. The smallest end of the casing is passed upwardly through a suitable opening in the floor board 6 of the automobile preferably at the front of the automobile and a little to the right of the driver's seat.

At said end the casing 5 is provided with an outstanding flange 7 extending entirely about the casing, and adapted to be bolted or otherwise secured to the floor board 6.

The smallest end of the casing, now and hereinafter to be referred to as the upper end of the casing is closed, through the medium of a transparent panel 8, the latter being arranged in a suitably grooved frame 9 that has extending from one side thereof a flange 10 fitting conformably within said upper end of the casing 5.

When suspended in position, the casing is inclined slightly as suggested, and the casing at the lower and widest end thereof is provided with an inclined bottom wall 11, the lowest end of which terminates adjacent the lower edge of an aperture 12 provided in the rear wall 13 of the casing 5.

Supported interiorly of the casing 5, and resting on the bottom wall 11 thereof is a mirror 14 retained in position, through the medium of a flanged retaining strip 15, the strip 15 extending along the front wall 16 and side walls 17 of the casing, with the flange of the member 15 resting against the mirror 14 at the marginal edges thereof. At the lower edge of the opening 12 the rear wall 13 of the casing is provided with a suitable channel 18 for receiving an adjacent marginal edge of the mirror 14.

From the foregoing, it will be seen that in actual practice, with the rear vision device located as described, and apparent from a study of Figure 1 in the drawings, the operator of the automobile or similar vehicle "backing" or "reversing" may by looking through the panel 8, by reason of the mirror 14 ascertain whether or not there is any obstruction to the rear or whether or not a vehicle or pedestrian is in the act of crossing the path of travel.

As is apparent, the location of the device precludes a possibility of the operator's vision to the rear becoming obstructed by a second person in the automobile, while at the same time the device being relatively fixed, it is not likely to be easily displaced as is the case where rear vision mirrors mounted for universal movement are employed.

Even though I have herein shown and described the preferred embodiment of the invention, it is to be understood that the same is susceptible of further changes, modifications and improvements coming within the scope of the appended claims.

Having thus described my invention, what I claim as new is:

1. In combination with a vehicle having a floor board provided with an opening, an inclined casing depending from the floor board in line with the opening, said casing being open at the top and having a substantially horizontal flange around its open top whereby the casing is supported from the floor board, said casing also having a rear wall apertured adjacent the lower end thereof, a mirror in the casing inclined opposite to the inclination of the casing and arranged adjacent to the aperture in said rear wall, a transparent panel closing the top of the casing, a frame for the transparent panel and supporting it substantially in the plane of the floor board, and said frame having a continuance depending flange which telescopes within the casing.

2. A rear vision mirror of the kind described comprising a tapered casing open at its smallest end, and having a supporting flange extending about said end, a removable frame in said smallest end of the casing, a transparent panel mounted in the frame, an inclined wall closing the widest end of the casing, a mirror resting flatly on said inclined wall, and said casing adjacent said widest end having its longitudinal wall provided with an aperture.

3. In combination with a vehicle having a floor board provided with an opening, a casing having an end extending through the opening, and having a flange at said end engaging the floor board; a grooved frame having a part telescoped into said end of the casing, a transparent panel mounted in the frame, and an inclined mirror within the casing beneath said transparent panel.

In testimony whereof I affix my signature.

WILLIAM Z. FROMER.